United States Patent [19]

Ringdal

[11] 4,314,954
[45] Feb. 9, 1982

[54] METHOD OF PRODUCING MOLDED BODIES OF EXPANDED PLASTIC

[75] Inventor: Lars Ringdal, Oslo, Norway

[73] Assignee: Bakelittfabrikken A/S, Oslo, Norway

[21] Appl. No.: 72,925

[22] Filed: Sep. 6, 1979

[30] Foreign Application Priority Data

Sep. 13, 1978 [NO] Norway .................................. 783102

[51] Int. Cl.³ .......................... B29D 27/00; B29F 1/08
[52] U.S. Cl. .................................. 264/45.5; 264/46.4;
264/46.7; 264/46.9; 264/55; 264/245; 264/248;
264/260; 264/271.1; 264/DIG. 18; 264/DIG.
64; 264/DIG. 83; 425/588; 425/817 R
[58] Field of Search .............. 264/DIG. 18, DIG. 83,
264/45.5, 46.4, 46.7, 46.9, 55, 245, 248, 260,
271.1, DIG. 64; 425/588, 817 R

[56] References Cited

U.S. PATENT DOCUMENTS

| | | | |
|---|---|---|---|
| 1,876,166 | 9/1932 | Randall | 264/46.7 X |
| 2,247,337 | 6/1941 | Raflovich | 264/46.7 X |
| 3,098,832 | 7/1963 | Pooley et al. | 264/DIG. 18 |
| 3,592,785 | 7/1971 | Patterson et al. | 264/DIG. 18 |
| 3,818,086 | 6/1974 | Stastny et al. | 264/DIG. 18 |
| 3,925,526 | 12/1975 | Haas | 264/DIG. 83 |
| 3,985,951 | 10/1976 | Harris | 264/46.9 X |
| 3,991,146 | 11/1976 | Barrie | 264/DIG. 83 |
| 4,021,380 | 5/1977 | Nuttall | 264/DIG. 18 |
| 4,073,844 | 2/1978 | Wada et al. | 264/DIG. 18 |
| 4,152,798 | 5/1979 | Akaura et al. | 264/46.4 X |

FOREIGN PATENT DOCUMENTS 47-11912 4/1972 Japan.
1101693 1/1968 United Kingdom.

Primary Examiner—Philip Anderson
Attorney, Agent, or Firm—Cushman, Darby & Cushman

[57] ABSTRACT

The invention relates to a method of producing molded bodies of expanded plastic having a predetermined density, based on a starting material in granulate form to which a blowing agent and optionally a cross-linking agent have been added, said starting material being introduced into an injection molding machine/press in which it is heated and injected/pressed into a mold. In order to obtain an efficient production process without loss of raw material and a product whose density can be determined in advance, the material in the injection molding machine/press is heated to a temperature which is below the temperature required to initiate the reaction of the blowing agent/cross-linking agent, and the blank thus formed is subsequently transferred to an expansion mold having the shape of the desired final product, but larger, than the blank. The blank is caused to expand in the expansion mold and final expansion takes place outside the expansion mold. One is thus permitted to operate with a lower pressure than required previously.

10 Claims, 9 Drawing Figures

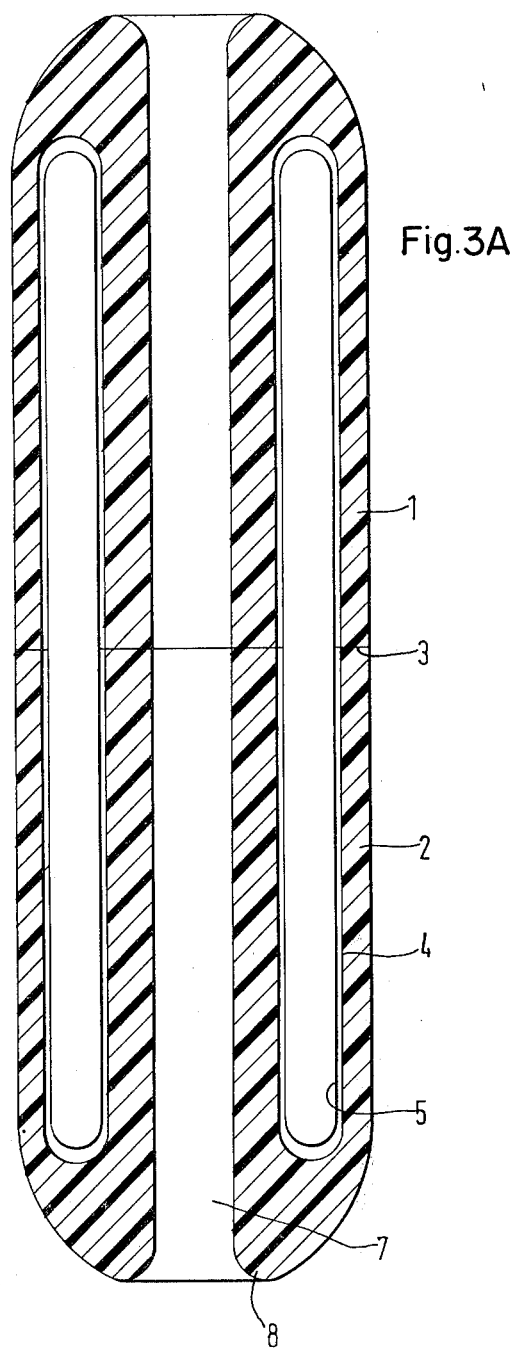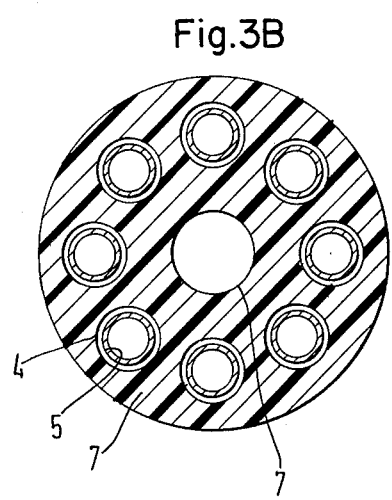
Fig.3A
Fig.3B

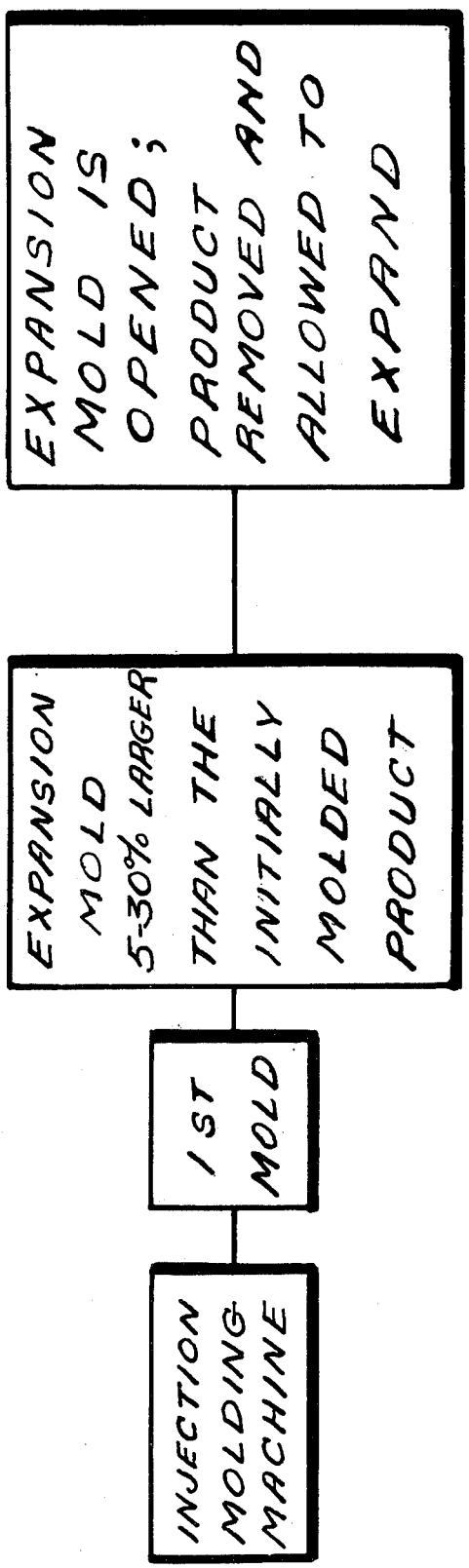

METHOD OF PRODUCING MOLDED BODIES OF EXPANDED PLASTIC

The invention pertains to a method of producing molded bodies of expanded plastic, in which a starting material of plastic, preferably in granulate form, to which a blowing agent and optionally cross-linking agents have been added is introduced into an injection molding machine or the like, where the starting material is heated and sprayed/pressed into a mold. Several methods are in use today for manufacturing molded bodies of expanded plastic. The most commonly used material up to now has been polyvinyl chloride; a blowing agent is mixed with the plastics material and the mixture is subsequently filled into molds, either as a paste or in granulate form. The filled molds are then closed and heated under high pressure to temperatures at which the expansion agent becomes activated, causing the formation of small closed cells in the plastic. After this process has been completed, the molds containing the product must be completely cooled down before the product can be removed from the mold. The next step is then to heat the product to such a degree that the plastics material softens and the highly compressed air in the closed cells expands, and the expanded product is then finished.

Another method which is used is that a plastic in granulate form is mixed with a blowing agent and optionally also with chemicals for cross-linking the molecules. This mixture of materials is then introduced into a conventional injection molding machine/press in which the material is heated to such a degree that the plastics material becomes plastic, and it is then injected into a mold having a higher temperature. The temperature in the mold is so high that the added blowing agent and cross-linking chemicals will react and form small closed air cells. After about 4–5 minutes the product can be removed from the molds; for larger products, correspondingly longer time will be required. This method has the disadvantage that the injection molding machine/press has to remain idle between 5 to 10 minutes until the product can be removed; another significant disadvantage is that the supply pipes in the injection molding apparatus have to be relatively large so that they do not become blocked when the material expands in the hot mold. There is thus a relatively large amount of wasted material in the supply pipes. This material in the pipes is already expanded and must be expelled and discarded, as it cannot be re-used. Substantial difficulties are also encountered when the material is to be distributed to a larger number of products in each mold.

A method of providing an expandable thermoplastic mixture is known from German Pat. No. 2.434.085 in which a small amount of blowing agent is mixed together with thermoplastic resin in an extruder, and the extruded product is divided into expandable pellets which are suitable for direct introduction into an injection molding machine/press. An expandable granulate of this type can be utilized instead of the above-described mixture of materials.

In addition, British Pat. No. 1,101,693 describes a method of molding and transporting objects in a gel state. In this method, the object is formed in a conventional manner in a mold, but is removed from the mold while still in a gel state, and is then carried to a curing oven. Although this method allows one to utilize the molds more efficiently, it does require a support means for transporting the product, which cannot maintain its shape without external support, to the curing oven. The product cannot be stored, either, and one has no way of regulating the degree of expansion.

The problem which the present invention sets out to solve is to provide a method of producing molded bodies of expanded plastics in which the above-mentioned disadvantages are avoided and with which one thus obtains the most efficient production process possible, with no loss of raw material in the supply pipes and the like. In addition, the invention should provide a more flexible method of production than the previously known methods.

These intensions are realized by means of a method which is characterized by the feature recited in the appurtenant patent claims.

In the method of the invention, a known per se injection molding machine/press is utilized, but the temperature in the mold is held so low that the added expansion agents and cross-linking agents do not become reactive. As a result, there is no expansion of the material in the supply pipes, either, and the material which remains inside these pipes can be led back to the starting material in the injection molding machine and used again, such that one avoids any loss of raw material. In addition, since the mold does not have to be cooled, the injection molding machine can work much more quickly, and the periods of waiting characteristic of the known prior art methods is avoided. The blank which is removed from the mold has not yet expanded and is therefore small in size.

Normally, when producing molded bodies of expanded plastic with closed cells, it is necessary to utilize high pressure during the molding process, for example, on the order of 300–400 kg/cm$^2$. With the invention, such high pressure can be avoided, and one can work with a pressure of an order of magnitude of 30–150 kg/cm$^2$. This in turn means that one obtains a substantial simplification of the work and equipment. In the prior art methods in which the material is introduced to the injection-molding apparatus in a liquid state, it has also been difficult to obtain densities lower than 0.25–0.30 of the density of the initial starting material. With the method of the invention, in which the increase in volume occurs in the second stage of the process, one can utilize an increase in volume of 20–25% and thus obtain densities of less than 0.20 of the density of the initial starting material. This represents a substantial improvement in relation to the prior art.

A very substantial advantage obtained with the method of the invention is that one can reduce the working pressure required during the reaction process for the expansion agent and cross-linking agent and determine the density of the final product in relation to the density of the starting material.

In the known injection-molding methods in hot molds, a pressure of between 300–400 kg/cm$^2$ is necessary at this pressure, a leakage of expanding agent can easily occur, which causes cracks in the product, and one obtains densities of about 0.25–0.30 of the starting material density. When the injection-molded formed product or blank produced in accordance with the invention is removed from the mold and placed into larger expansion molds, the pressure necessary during the expansion process can be reduced to, for example, about 150 kg/cm$^2$, and one can obtain a final product having a density of 0.15–0.20 of the starting material's density. By utilizing a still larger expansion mold, the pressure can be reduced to, for example, 30–50 kg/cm$^2$, and one also obtains densities of below 0.10 in relation to the density of the starting material. One can thus select the working pressure and the density of the final product in a very simple, safe and work-saving manner.

Another substantial advantage is that the production process can be interrupted at this point, and the blanks which thus constitute a sort of intermediate product can be transported to any suitable location, even over long distances, for further operations to obtain the finished product. The blank can also be stored, and in this way one obtains a substantial increase in efficiency and flexibility in the production cycle. If, for example, final production of the product is to be carried out in another country, one obtains significant reductions in freight costs because the volume of the blank is substantially smaller than the volume of the finished product. The division of the production process into two stages also provides another very important advantage, in that several blanks can then be placed together in the expansion mold, and when the blanks are subsequently expanded and cross-linked, they will become bonded together to form one homogeneous body. In this way, even very large products can be produced, or products in several colors in which the entire cross section of the product is colored all the way through, or other material can be inserted in a simple manner into the products to provide a reinforcing effect. Owing to the special mechanics of this production method, it is also possible to produce a blank which is hollow, such that when the blank is subsequently expanded the expansion process itself can occur inwardly as well as outwardly, with the result that the size of the product can be increased and its density reduced to a greater degree than is possible with the prior art methods.

One can also place a written text, decorations or the like in the expansion mold, and when the material is expanded, the text will become embedded in the product so that it cannot later be removed.

It should be noted that one obtains a 10 to 30% savings of raw material by preventing a loss of material in the supply pipes. The capacity of the injection molding machine/press which is the expensive link in the production chain, can be increased by up to 10 times. The freight costs for sending the products can be reduced by 70–80%.

A wide spectrum of different products can be produced with the method of the invention, including, for example, floats and buoys, and also life buoys, etc.

The invention will be elucidated in greater detail in the following by means of an embodiment example of the method and examples of products made in accordance with the method of the invention. On the drawings, FIG. 1A is a longitudinal section of a float;

FIG. 3A is a longitudinal section of a third embodiment of a float;

FIG. 3B is a transverse cross-section of the float of FIG. 3A;

FIG. 5 is a flow sheet illustrating the method of the invention.

In the method according to the invention, which is illustrated in FIG. 5, one can for example utilize ethylene-vinyl acetate resin (EVA) which is a thermoplastic material, and this material is fed as a powder or granulate to an extruder where it is ground up and mixed with a suitable blowing agent and a cross-linking agent. This starting material is heated to a temperature of about 90°–120° C. At this temperature, neither the expansion agent nor the cross-linking agent become activated, but the starting material becomes plastic, and it is then injection-molded in a mold which maintains this temperature. As no expansion is supposed to take place in the injection molding machine/press, the blank formed in the mold can then be removed and transferred to a suitable location for the production of the desired end product. The production time in the injection molding machine/press can be reduced from the conventional time of approximately 5 minutes to about ½ minute. This means that one can produce the same number of products on one injection molding machine as one would have needed about ten machines to produce with the methods known up to the present time.

At the second working location, the initially molded product or blank is placed in simple, inexpensive new molds which are adapted for expansion, perhaps, for example, cast aluminum molds, and several blanks can be placed in each mold. The mold is closed, and because one does not have to contend with an injection pressure from an injection molding machine/press it is not necessary to provide as high a closing pressure on the mold or mold block. When the mold is locked, the mold block is pushed into a tunnel or circulating oven and heated such that the added blowing agents and cross-linking chemicals react. The mold can also be placed in a press to provide the desired closing and heating.

After the mold has circulated through the oven, the mold/block is drawn out and placed in a press which clamps the mold halves tightly together while the locking means is released. The mold blocks are then very quickly separated from one another while at the same time a releasing means working at the same pace removes the product from the mold. The product immediately expands into its permanent shape.

Figure 1A:
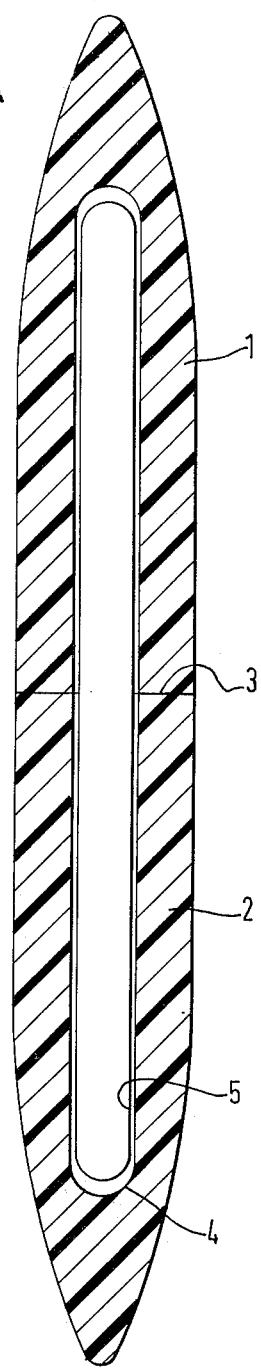
FIG. 1B is a transverse cross-section of the float of FIG. 1A.
Figure 1B:
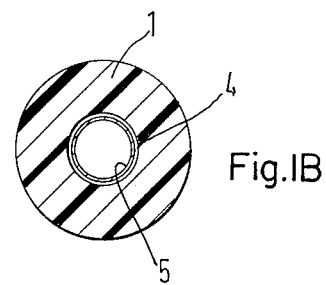
Figure 2A:
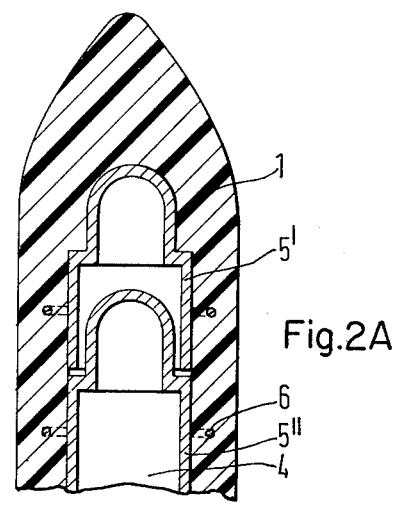
FIG. 2A is a fragmentary longitudinal section of a second embodiment of a float.
Figure 2B:
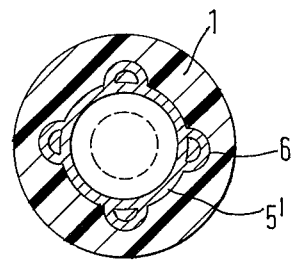
FIG. 2B is a transverse cross-section of the float of FIG. 2A.

The drawings illustrate different embodiments of such products. FIGS. 1A and 1B show a float which is composed of two blanks, parts 1 and 2. The significant expansion will occur in width. The members 1 and 2 are of the same shape and have an internal cavity 4 in which a stiffening collar 5 can be inserted. The two members are placed in the expansion mold with their end surface as indicated at reference numeral 3, to form the desired finished shape. The mold is then closed and the blank expands to the desired size under the effects of temperature. As the material expands, the internal collar will become permanently embedded in the material, and the parts will be bonded together at the mating surface 3 into a homogeneous product. If a more flexible reinforcement for a pliable float is desired, the inner collar could for example be constructed as shown in FIGS. 2A and 2B, of several shell-formed parts nested such that one partially overlaps the next, thus permitting them to slide by bending in relation to each other but without opening the internal space to the expansion mass. In this way, an air-filled chamber is also formed in the interior of the collar, which increases the buoyancy of such a float. To ensure that the parts become securely affixed in the expanded material, the insert parts can be provided with lugs or securing members 6, as shown in FIGS. 2A and 2B.

If a larger expansion is desired, the collar of FIGS. 1A and 1B could also be omitted, such that the material can expand inwardly as well as outwardly. In this way, the density of the final product can be reduced from about 0.95–0.10, in relation to the density of the starting material.

Another embodiment of a float body, this float having a through opening of a hole for a rope, is shown in FIGS. 3A and 3B, the opening or channel being designated 7. In this embodiment, a plurality of cavities 4 are provided in the body, which is entirely possible with the method of the invention because the product is made of two blanks 1 and 2 which are positioned adjacently at the mating surface 3. Collars 5 have also been inserted in this embodiment, but this is not absolutely necessary. The collars 5 could also, for example, take the form shown in FIGS. 2A and 2B. The inner cylinder can be made of plastic or metal. To obtain a reinforcement of such a float in the end sections at 8, one has the option, using the method of the invention, of providing the expansion mold with cooling ducts in these areas such that one obtains a thickening of the material in these regions. In this way, one can produce regions of greater density of material in desired locations on a product.

Figure 4A:
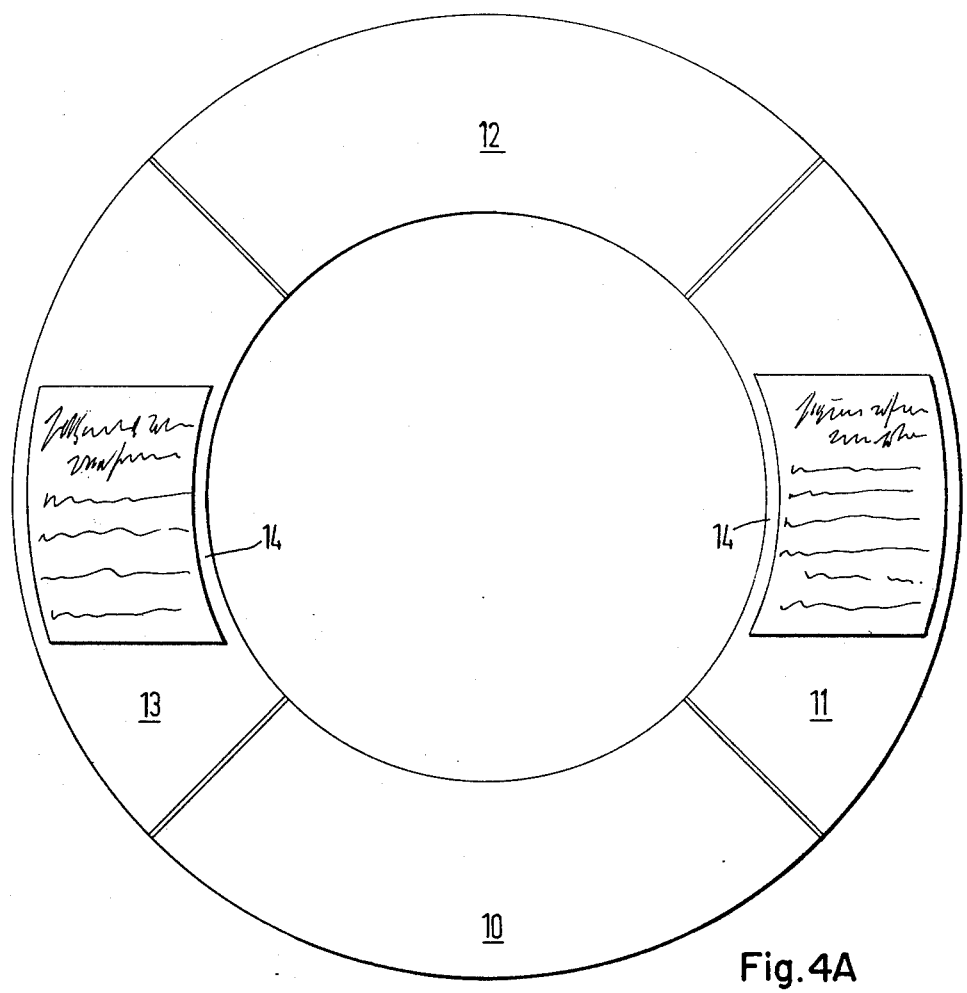
FIG. 4A is a plan view of a life buoy.
Figure 4B:
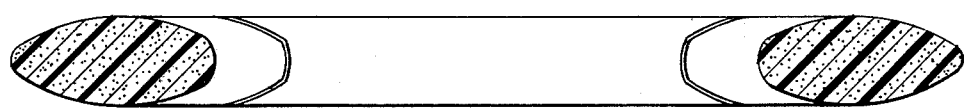
FIG. 4B is a cross-section of the life buoy of FIG. 4A.

FIGS. 4A and 4B show an embodiment example in which a life buoy is composed of four parts 10,11,12 and 13. The parts 10 and 12, for example, could be made of orange-colored plastic, while the parts 11 and 13 could be white. Instructions for life-saving, mouth-to-mouth resuscitation, etc., could be placed on the white areas 11 and 13. As the blanks which have been placed adjacent in the expansion mold are expanded, the parts 10–13 will melt together to form a homogeneous product. At the same time, one will obtain a thin film of clear plastic covering the instructions 14, such that these also become embedded in the finished product and cannot be removed or worn off. One thus obtains a life buoy with color throughout the material and with very good usefulness and practicality.

Having described my invention, I claim:

1. A method of producing molded bodies of expanded plastic of a predetermined density, in which a starting marterial of plastic in granulate or powder form to which a blowing agent and optionally a cross-linking agent have been added is introduced into an injection molding machine where the starting material is heated and injected into a mold, characterized in that the material is heated to a temperature at which it becomes plastic but which is lower than the temperature required to initiate the reaction of the blowing agent and optional cross-linking agent, that the material in this state is injected into a mold having a lower temperature and is given a shape approximately that of the desired final product, after which the blank thus formed is transferred at any suitable later time to an expansion mold having the shape of the desired product but of larger dimensions than the initially molded blank, and is heated in this mold to the activating temperature for the blowing agent and the optional cross-linking agent and thereby expanded, after which the blank is quickly removed from the mold and immediately expands into its permanent shape.

2. A method according to claim 1, characterized in that separate parts of the desired end product are molded in the injection molding machine, and two or more of the said separate parts are placed together in the expansion mold, where they are bonded together by expansion and cross-linking to form the finished desired product.

3. A method according to claim 2, characterized in that the separate parts are formed with cavities and are placed in the expansion mold with the cavities facing toward one another, said cavities then becoming filled during the expansion process.

4. A method according to claim 3, characterized in that hollow members of greater rigidity are inserted in the cavities, said members becoming surrounded by the expanded material during the expansion process.

5. A method according to claim 1, characterized in that the blanks in the expansion mold are subjected to a cooling effect at specified locations at which a partial extra reinforcement is desired in the finished product.

6. A method according to claim 1, characterized in that contoured decorations are inserted in the expansion mold so that during the expansion process in the expansion mold the decorations melt into the material.

7. A method according to claim 1, characterized in that blanks in different colors and qualities are placed together or beside one another, in the expansion mold, and during the expansion process said blanks flow together in the joints therebetween to form an integral whole.

8. A method according to claim 4, characterized in that nesting parts are used as the insert members, which partially overlap one another and which are provided with securing members on the outside.

9. A method according to claim 4, characterized in that beads of hollow material are utilized as insert members.

10. A method as in claim 1 wherein the dimensions of the expansion mold are 5%–30% larger than the dimensions of the initially molded blank.

* * * * *